(12) United States Patent
Park et al.

(10) Patent No.: US 11,052,861 B2
(45) Date of Patent: Jul. 6, 2021

(54) AIRBAG APPARATUS FOR VEHICLE

(71) Applicant: HYUNDAI MOBIS CO., LTD., Seoul (KR)

(72) Inventors: Hae Kwon Park, Yongin-si (KR); Ga Ram Jeong, Yongin-si (KR); Do Hyoung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 45 days.

(21) Appl. No.: 16/680,754

(22) Filed: Nov. 12, 2019

(65) Prior Publication Data
US 2020/0164828 A1    May 28, 2020

(30) Foreign Application Priority Data
Nov. 22, 2018 (KR) .................. 10-2018-0145123

(51) Int. Cl.
| | | |
|---|---|---|
| *B60R 21/233* | (2006.01) | |
| *B60R 21/207* | (2006.01) | |
| *B60R 21/2338* | (2011.01) | |
| *B60R 21/231* | (2011.01) | |

(52) U.S. Cl.
CPC .......... *B60R 21/233* (2013.01); *B60R 21/207* (2013.01); *B60R 21/2338* (2013.01); *B60R 2021/23146* (2013.01); *B60R 2021/23308* (2013.01)

(58) Field of Classification Search
CPC . B60R 21/233; B60R 21/207; B60R 21/2338; B60R 2021/23146; B60R 2021/23308; B60R 2021/23388
See application file for complete search history.

(56) References Cited

U.S. PATENT DOCUMENTS

| | | | | | |
|---|---|---|---|---|---|
| 4,592,523 | A  | * | 6/1986 | Herndon | B64D 25/02 244/122 AG |
| 6,315,245 | B1 | * | 11/2001 | Ruff | B64D 25/02 244/122 AG |
| 2019/0031132 | A1 | * | 1/2019 | Dry | B60R 21/207 |
| 2019/0031133 | A1 | * | 1/2019 | Dry | B60R 21/23138 |
| 2019/0054884 | A1 | * | 2/2019 | Dry | B60R 21/2338 |
| 2019/0071046 | A1 | * | 3/2019 | Dry | B60R 21/207 |
| 2019/0217803 | A1 | * | 7/2019 | Dry | B60R 21/23138 |
| 2019/0291678 | A1 | * | 9/2019 | Cho | B60R 21/231 |
| 2020/0290551 | A1 | * | 9/2020 | Shimizu | B60N 2/0232 |
| 2020/0317154 | A1 | * | 10/2020 | Choi | B60R 21/207 |
| 2020/0391690 | A1 | * | 12/2020 | Faruque | B60R 21/2338 |
| 2021/0009067 | A1 | * | 1/2021 | Kadam | B60R 21/2338 |
| 2021/0009074 | A1 | * | 1/2021 | Wold | B60R 21/2342 |
| 2021/0039578 | A1 | * | 2/2021 | Rupp | B60R 21/207 |

FOREIGN PATENT DOCUMENTS

WO    WO-2020130427 A1 *  6/2020  .......... B60R 21/233

* cited by examiner

*Primary Examiner* — Drew J Brown
(74) *Attorney, Agent, or Firm* — H.C. Park & Associates, PLC (57) ABSTRACT

An airbag apparatus for a vehicle may include: a surrounding airbag installed in a seat on which a passenger is seated, and deployed toward the passenger so as to cover an upper part and side parts of the passenger; a front airbag connected to the surrounding airbag, and laterally deployed to cover a front part of the passenger; and a behavior constraint tether extended from the front airbag to an upper portion of the surrounding airbag so as to constrain the surrounding airbag and the front airbag, and configured to constrain a forward behavior of the passenger through a tensile force.

12 Claims, 8 Drawing Sheets

AIRBAG APPARATUS FOR VEHICLE

CROSS-REFERENCE TO RELATED APPLICATION

This application claims priority from and the benefit of Korean Patent Application No. 10-2018-0145123, filed on Nov. 22, 2018, which is hereby incorporated by reference for all purposes as if set forth herein.

BACKGROUND

Field

Exemplary embodiments relate to an airbag apparatus for a vehicle, and more particularly, to an airbag apparatus for a vehicle, which can protect a passenger in case of a vehicle collision.

Discussion of the Background

In general, a vehicle includes a safety device for stably protecting a passenger from an accident such as a collision or overturn. Examples of the safety device may include a safety belt for fastening the body of a passenger and an airbag for reducing an impact which occurs when a passenger bumps against a vehicle body.

Recently, research and development are actively conducted on the commercialization of an autonomous vehicle which does not need to be driven by a passenger. The autonomous vehicle preferably has a seat structure which can be moved or rotated to enable a passenger to efficiently utilize an interior space of the vehicle while taking a rest or performing a task. Furthermore, research and development are conducted on a structure for enabling a passenger to take a freer posture by removing a safety belt which constrains the body of the passenger.

However, in case of a collision accident of an autonomous vehicle, it is more difficult to secure the safety of a passenger who takes a free posture in a random direction. Furthermore, there is a limitation in securing the safety of the passenger through an existing airbag structure. Therefore, there is a demand for the development of an airbag apparatus which can be suitably applied to an autonomous vehicle and of which the safety is further reinforced.

The above information disclosed in this Background section is only for enhancement of understanding of the background of the invention and, therefore, it may contain information that does not constitute prior art.

SUMMARY

Exemplary embodiments of the present invention provide an airbag apparatus for a vehicle, which can protect a passenger in all directions including front, top and sides.

Additional features of the invention will be set forth in the description which follows, and in part will be apparent from the description, or may be learned by practice of the invention.

An exemplary embodiment of the present invention discloses an airbag apparatus for a vehicle may including: a surrounding airbag installed in a seat on which a passenger is seated, and deployed toward the passenger so as to cover an upper part and side parts of the passenger; a front airbag connected to the surrounding airbag, and laterally deployed to cover a front part of the passenger; and a behavior constraint tether extended from the front airbag to an upper portion of the surrounding airbag so as to constrain the surrounding airbag and the front airbag, and configured to constrain a forward behavior of the passenger through a tensile force.

The surrounding airbag and the front airbag may be folded in a reverse U-shape and stored in the seat.

The surrounding airbag may include: an upper deployment part installed in the upper portion of the seat and deployed forward from the top of the passenger; and side deployment parts installed in side portions of the seat, connected to the front airbag, and deployed forward from the left and right sides of the passenger with the upper deployment part.

The front airbag may include: a rightward deployment part connected to the left side of the surrounding airbag, and deployed to the right at the front of the passenger; and a leftward deployment part connected to the right side of the surrounding airbag, and deployed to the left at the front of the passenger so as to overlap the rightward deployment part.

The right edge of the rightward deployment part may be positioned on the right of the passenger when the rightward deployment part is deployed, and the left edge of the leftward deployment part may be positioned on the left of the passenger, when the leftward deployment part is deployed.

The behavior constraint tether may include: a right tether extended upward to the upper portion of the surrounding airbag along the right edge of the rightward deployment part; a left tether extended upward to the upper portion of the surrounding airbag along the left edge of the leftward deployment part; and a tether binding part slidably binding intermediate portions of the right tether and the left tether.

The right tether may include: a left fixed part fixed to the bottom of a left portion of the surrounding airbag; a rightward extension part extended from the left fixed part to the rightward deployment part so as to cross the left tether, and extended upward from the right of the left tether along the right edge of the rightward deployment part; a first sliding bound part formed at an upper portion of the rightward extension part and passing through the tether binding part; and a first pulled extension part disposed at the upper portion of the surrounding airbag, and connected to the first sliding bound part.

The left tether may include: a right fixed part fixed to the bottom of a right portion of the surrounding airbag; a leftward extension part extended from the right fixed part to the leftward deployment part so as to cross the right tether, and extended upward from the left of the right tether along the left edge of the leftward deployment part; a second sliding bound part formed at the upper portion of the leftward extension part and passing through the tether binding part; and a second pulled extension part disposed at the upper portion of the surrounding airbag, and connected to the second sliding bound part.

The tether binding part may be disposed at a higher level than the neck of the passenger.

The airbag apparatus may further include a tether controller configured to control a constraining force for the front part of the passenger by adjusting the length of the behavior constraint tether.

The tether controller may include: a tether in-out unit installed on the seat, and configured to adjust a tensile force applied to the behavior constraint tether while pulling or releasing the behavior constraint tether; an input unit configured to receive information on the passenger or a collision state of a vehicle; and a constraining force control unit configured to control the operation of the tether in-out unit according to the information inputted to the input unit, and adjust the constraining force of the behavior constraint tether for the passenger.

When the constraining force control unit operates the tether in-out unit, the behavior constraint tether and the front airbag may be closely contacted with the front part of the passenger at preset pressure, while the length of the behavior constraint tether is adjusted.

In the airbag apparatus for a vehicle in accordance with the embodiment of the present invention, the surrounding airbag and the front airbag may cover the passenger in all directions including the front, top and sides, in case of a collision of the vehicle. And as the surrounding airbag and the front airbag are constrained each other through the behavior constraint tether, the surrounding airbag and the front airbag may be reliably deployed in a predetermined shape.

Therefore, the airbag apparatus can stably protect the passenger through an omnidirectional cushion force, regardless of the posture of the passenger of the autonomous vehicle and the direction, angle and position of the seat. Furthermore, although a front airbag and a side airbag are not separately mounted, the airbag apparatus can implement the same performance. Thus, the airbag apparatus can be easily applied.

Furthermore, the behavior constraint tether and the front airbag may be closely contacted with the passenger at the same time and serve as a safety belt. Thus, although an existing safety belt is omitted, the safety of the passenger can be secured, which makes it possible to increase the activity and convenience of the passenger at normal times.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
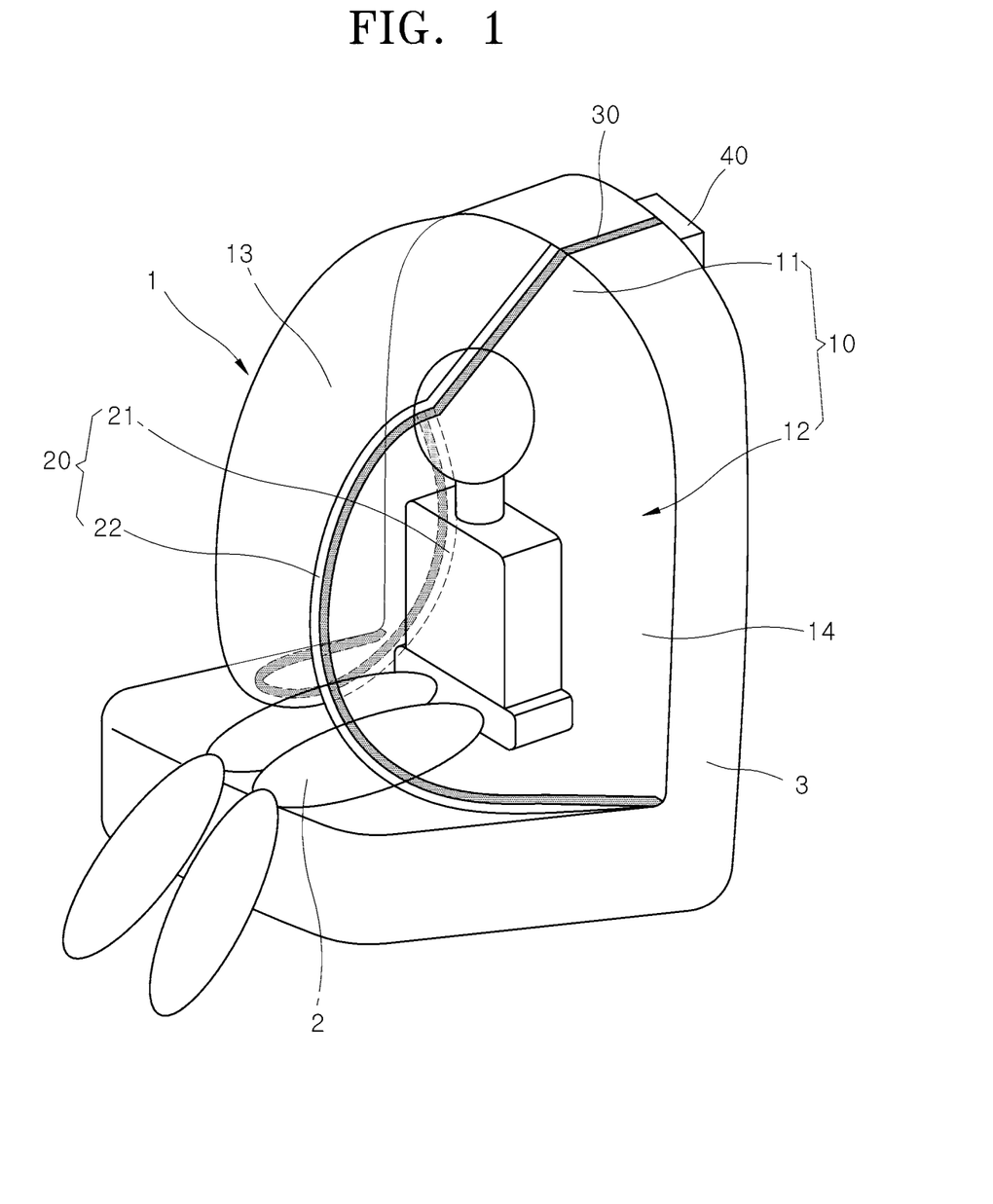
FIG. 1 is a perspective view schematically illustrating that an airbag apparatus for a vehicle in accordance with an embodiment of the present invention is deployed.

FIG. 1 is a perspective view schematically illustrating that an airbag apparatus for a vehicle in accordance with an embodiment of the present invention is deployed.

Referring to FIG. 1, the airbag apparatus 1 for a vehicle in accordance with the embodiment of the present invention may include a surrounding airbag 10, a front airbag 20, a behavior constraint tether 30 and a tether controller 40. The airbag apparatus 1 may be installed in the back of a seat 3 on which a passenger 2 is seated.

The surrounding airbag 10 may be deployed from the seat 3 positioned at the rear of the passenger 2 toward the passenger 2, that is, toward the front, and cover the upper part and side parts of the passenger 2 in a reverse U-shape. Referring to FIG. 1, the surrounding airbag 10 in accordance with the embodiment of the present invention may include an upper deployment part 11 and a side deployment part 12.

The upper deployment part 11 may be installed in the top of the seat 3 and deployed forward from the top of the passenger 2. The side deployment part 12 may be installed in either side of the seat 3, connected to the front airbag 20 so as to communicate with the front airbag 20, and deployed forward from the left and right sides of the passenger 2 with the upper deployment part 11. The side deployment part 12 may include a left deployment part 13 positioned on the left of the passenger 2 and a right deployment part 14 positioned on the right of the passenger 2.

The upper deployment part 11, the left deployment part 13 and the right deployment part 14 may be continuously connected to each other, and deployed forward from the top, left and right sides of the passenger 2. The surrounding airbag 10 may be deployed in such a shape to form a continuous air cushion that covers the entire part of the passenger 2 including the upper part and the left and right side parts of the passenger 2 in all directions.

The front airbag 20 may be connected to the surrounding airbag 10 so as to communicate with the surrounding airbag 10, deployed laterally from the front of the passenger 2 toward the body of the passenger 2, and cover the front part of the passenger 2. Referring to FIG. 1, the front airbag 20 in accordance with the embodiment of the present invention may include a rightward deployment part 21 and a leftward deployment part 22.

The rightward deployment part 21 may be connected to the left deployment part 13 of the surrounding airbag 10, and deployed to the right at the front of the passenger 2. The leftward deployment part 22 may be connected to the right deployment part 14 of the surrounding airbag 10, and deployed to the left at the front of the passenger 2 so as to overlap the rightward deployment part 21.

More specifically, when the front airbag 20 is deployed, a right end of the rightward deployment part 21 may be positioned at the right side portion of the passenger 2, a left end of the leftward deployment part 22 may be positioned at the left side portion of the passenger 2, and the rightward deployment part 21 and the leftward deployment part 22 may overlap each other. The front airbag 20 may be deployed in such a shape to form a continuous air cushion that crosses the front part of the passenger 2 in the side-to-side direction and the top-to-bottom. direction.

The behavior constraint tether 30 may be installed in the surrounding airbag 10 and the front airbag 20, and extended from the front airbag 20 to the upper deployment part 11 so as to constrain the surrounding airbag 10 and the front airbag 20. More specifically, the behavior constraint tether 30 may be constituted by a pair of behavior constraint tethers extended upward from the rightward deployment part 21 and the leftward deployment part 22, respectively, to the upper deployment part 11.

When the surrounding airbag 10 and the front airbag 20 are deployed, the behavior constraint tether 30 may be positioned in front of the passenger 2. Therefore, a tensile force applied to the behavior constraint tether 30 may stably constrain a forward behavior of the passenger 2 using the front airbag 20. The behavior constraint tether 30 may be formed of a flexible material such as a wire, fiber, belt or string, which can be flexibly bent by an external force.

The tether controller 40 may control a constraining force for the front part of the passenger 2 by adjusting the length of the behavior constraint tether 30. When the surrounding airbag 10 and the front airbag 20 are deployed, tension may be primarily applied to the behavior constraint tether 30 embedded in the surrounding airbag 10 and the front airbag 20, and the tether controller 40 may secondarily control the tension of the behavior constraint tether 30 depending on the body of the passenger 2 or a collision state of the vehicle. At this time, the behavior constraint tether 30 may control the behavior of the passenger 2 and replace the role of a seat belt.

Figure 2:
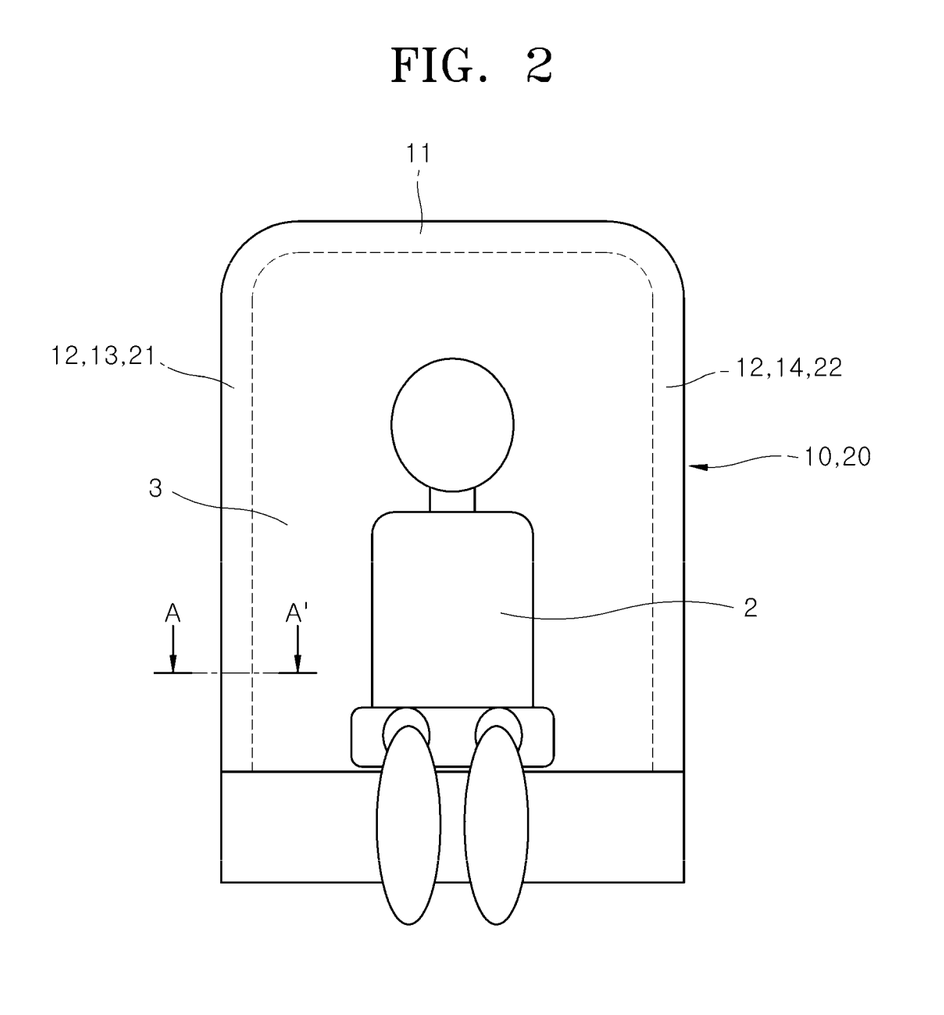
FIG. 2 is a front view schematically illustrating an installation state of the airbag apparatus for a vehicle in accordance with the embodiment of the present invention.
Figure 3:
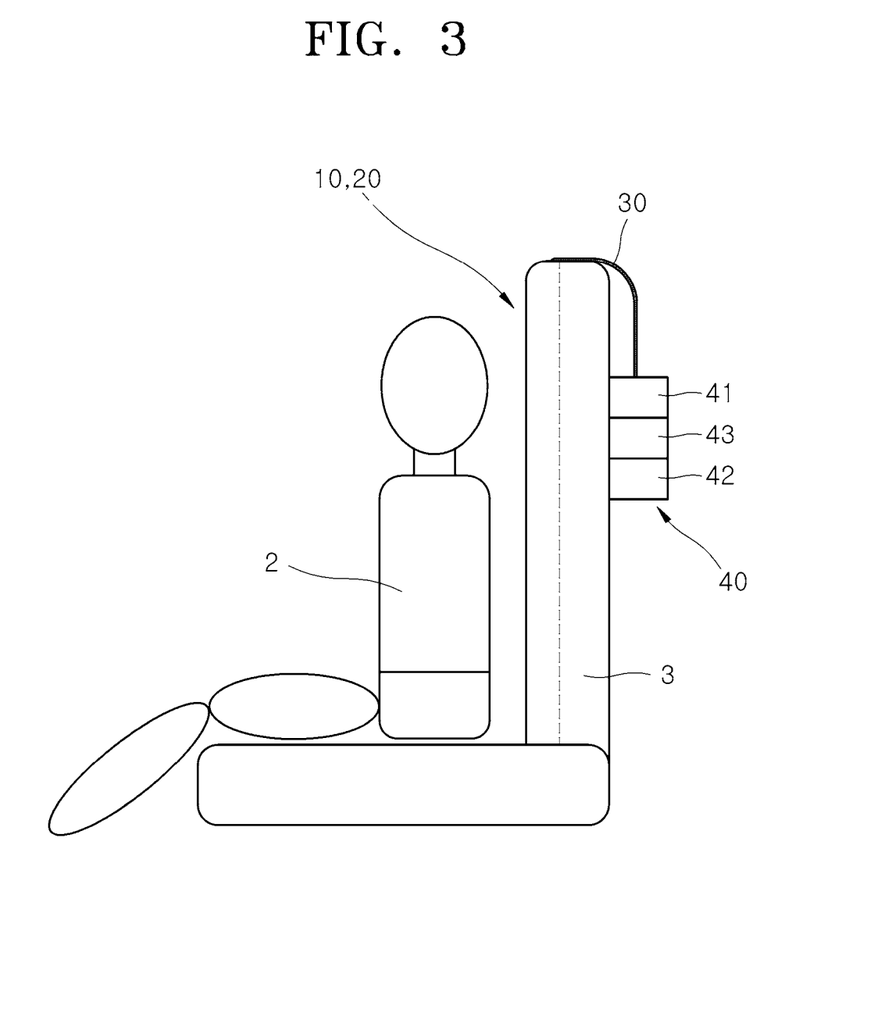
FIG. 3 is a right side view schematically illustrating the installation state of the airbag apparatus for a vehicle in accordance with the embodiment of the present invention.
Figure 4A:
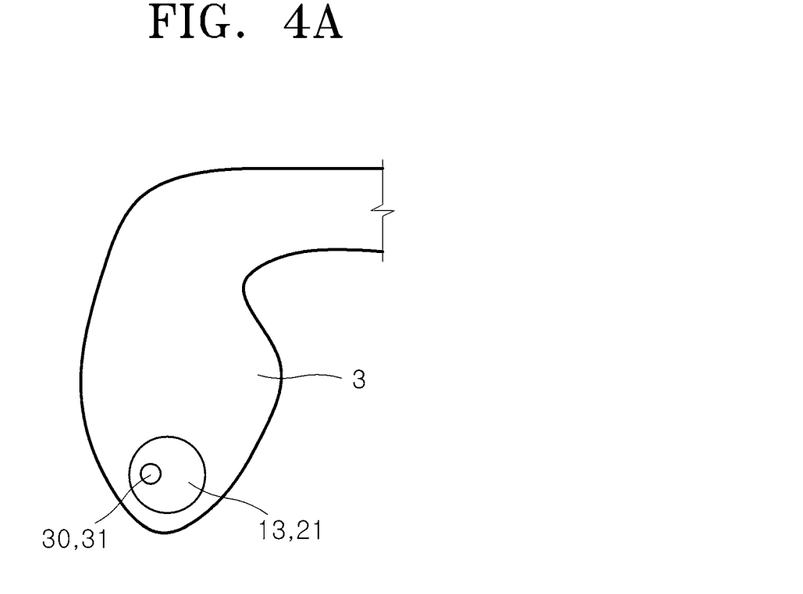
FIGS. 4A and 4B are cross-sectional views taken along line A-A' of FIG. 2.
Figure 4B:
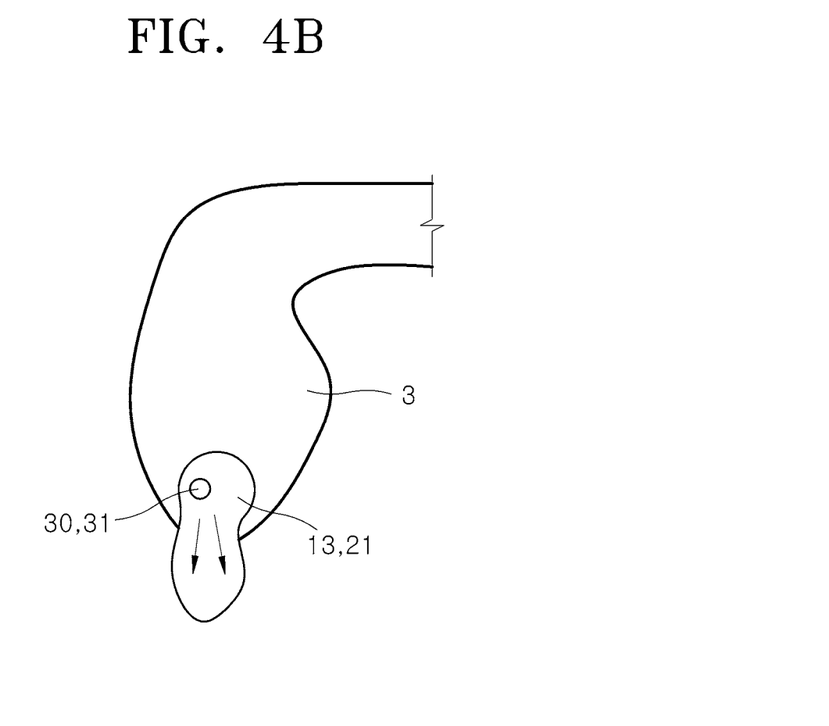

FIG. 2 is a front view schematically illustrating an installation state of the airbag apparatus for a vehicle in accordance with the embodiment of the present invention, FIG. 3 is a right side view schematically illustrating the installation state of the airbag apparatus for a vehicle in accordance with the embodiment of the present invention, and FIGS. 4A and 4B are cross-sectional views taken along line A-A' of FIG. 2.

In the descriptions of the present invention, the directions such as the left and right will be set based on the state in which the passenger 2 is seen from the front, that is, the state illustrated in FIG. 2, for convenience of description.

Referring to FIGS. 2 and 3, the surrounding airbag 10 and the front airbag 20 may be stored and mounted in the front portion of the back of the seat 3, and folded in a reverse U-shape along the edge of the back of the seat 3. The surrounding airbag 10 and the front airbag 20, which are disposed in the seat 3 as illustrated in FIG. 4A, may be deployed toward the passenger 2 as illustrated in FIG. 4B, in case of a vehicle collision. Then, the surrounding airbag 10 and the front airbag 20 may cover the passenger 2 seated on the seat 3 in all direction including the top, sides and front of the passenger 2.

Figure 5:
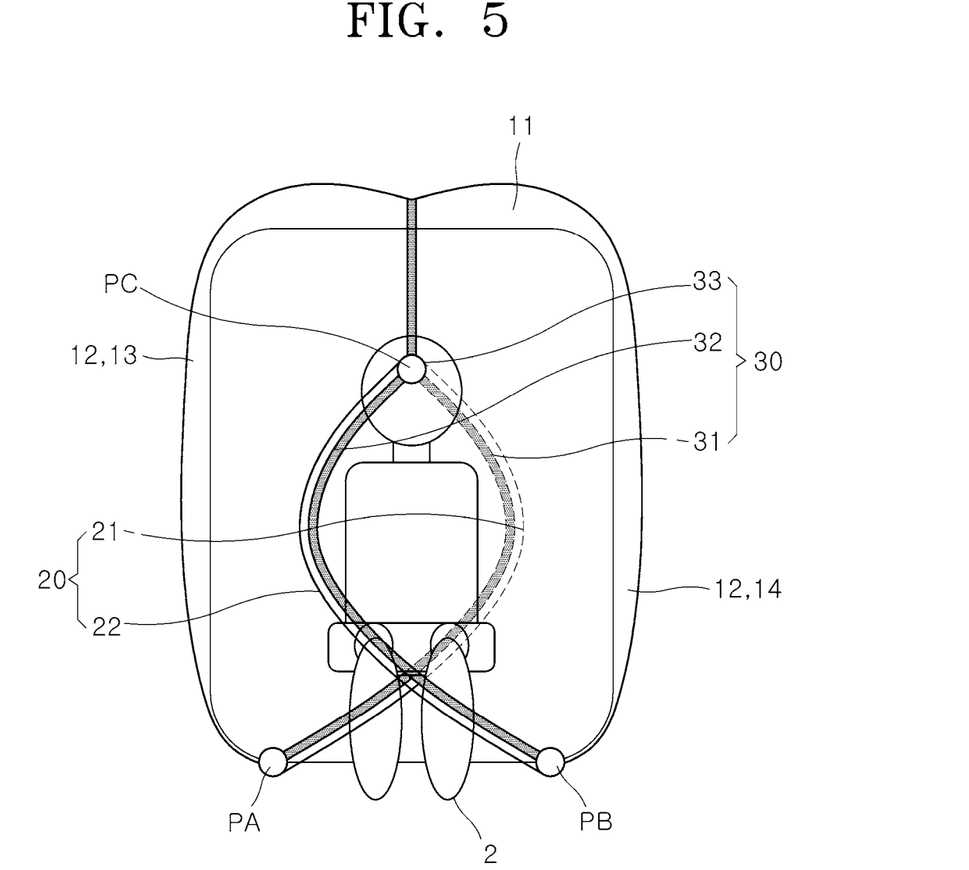
FIG. 5 is a front view schematically illustrating a deployment state of the airbag apparatus for a vehicle in accordance with the embodiment of the present embodiment.
Figure 6:
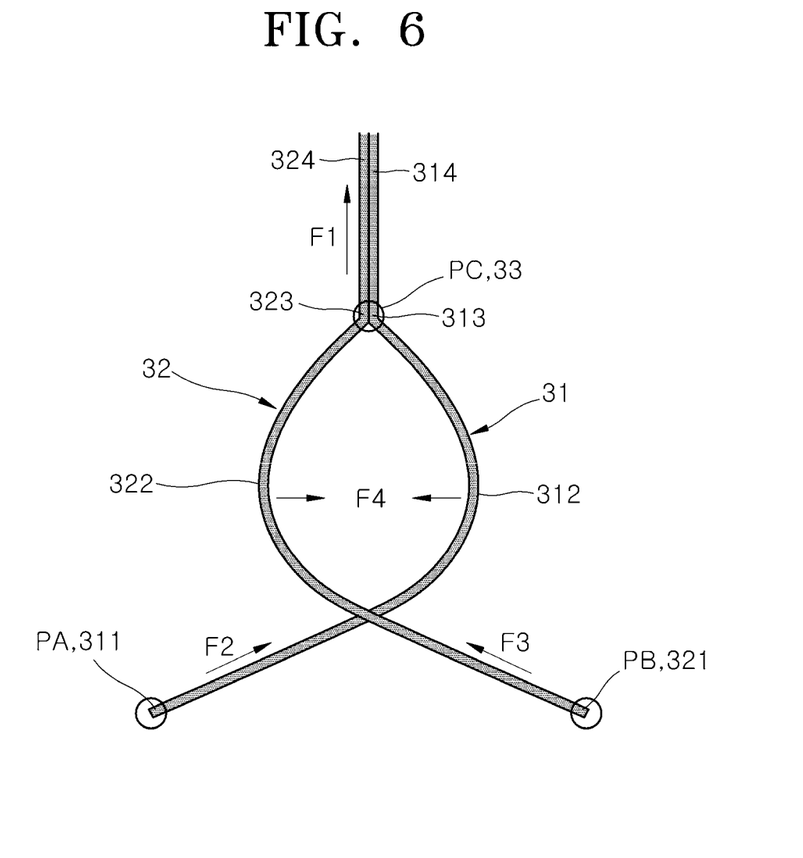
FIG. 6 is a conceptual view for describing a force applied by a behavior constraint tether of the airbag apparatus for a vehicle in accordance with the embodiment of the present invention.
Figure 7:
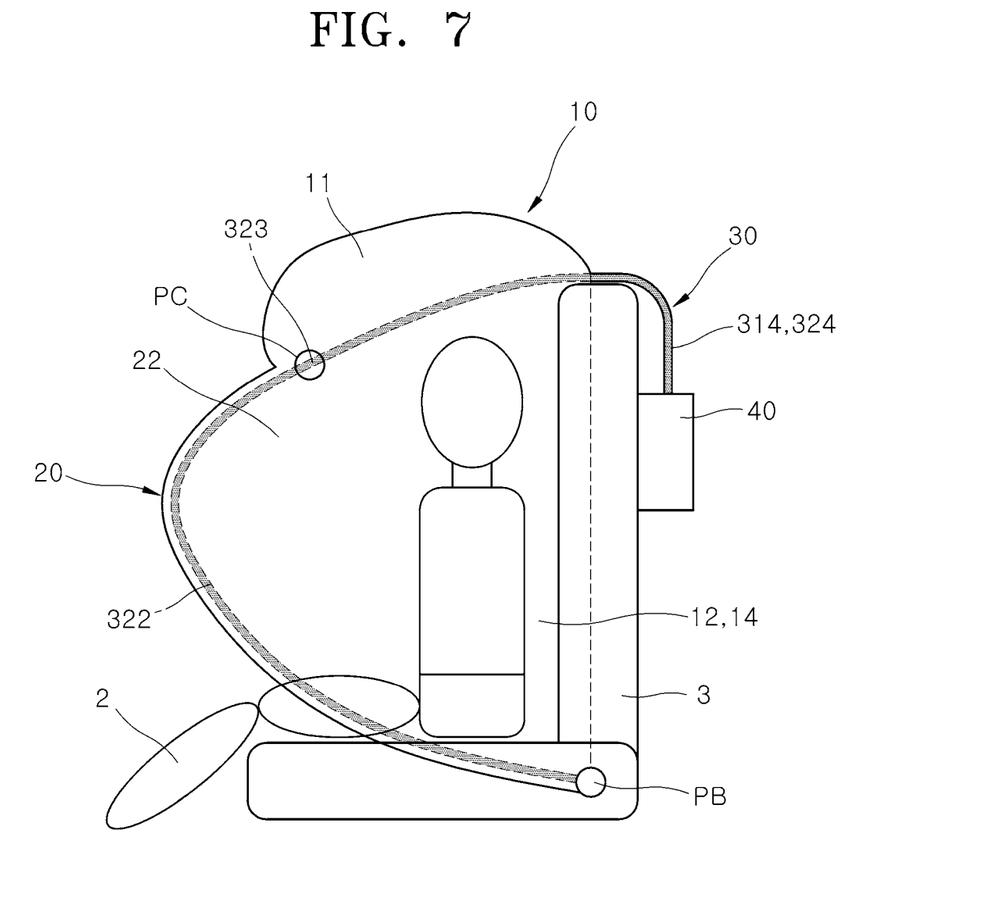
FIG. 7 is a right side view schematically illustrating the deployment state of the airbag apparatus for a vehicle in accordance with the embodiment of the present embodiment.

FIG. 5 is a front view schematically illustrating a deployment state of the airbag apparatus for a vehicle in accordance with the embodiment of the present embodiment, FIG. 6 is a conceptual view for describing a force applied by the behavior constraint tether of the airbag apparatus for a vehicle in accordance with the embodiment of the present invention, and FIG. 7 is a right side view schematically illustrating the deployment state of the airbag apparatus for a vehicle in accordance with the embodiment of the present embodiment.

Referring to FIG. 5, the behavior constraint tether 30 in accordance with the embodiment of the present invention may include a right tether 31, a left tether 32 and a tether binding part 33.

The right tether 31 may be extended upward to the upper portion of the surrounding airbag 10 along the right edge of the rightward deployment part 21. The left tether 32 may be extended upward to the upper portion of the surrounding airbag 10 along the left edge of the leftward deployment part 22. The tether binding part 33 may slidably bind the intermediate portions of the right tether 31 and the left tether 32. The tether binding part 33 may be disposed at the center of the lower portion of the upper deployment part 11 or the boundary (point PC) among the upper deployment part 11, the rightward deployment part 21 and the leftward deployment part 22.

Referring to FIGS. 5 and 6, the right tether 31 in accordance with the embodiment of the present invention may include a left fixed part 311, a rightward extension part 312, a first sliding bound part 313 and a first pulled extension part 314.

The left fixed part 311 may correspond to the lower end of the right tether 31, and be fixed to the bottom (point PA) of the left portion of the surrounding airbag 10. The rightward extension part 312 may be extended rightward from the left fixed part 311 toward the rightward deployment part 21 so as to cross the left tether 32, and extended upward along the right edge of the rightward deployment part 21 on the right of the left tether 32.

The rightward extension part 312 may be extended to the right from the left fixed part 311 and bent to the left, as a whole. In other words, the rightward extension part 312 may be extended in a rightward convex shape. The first sliding bound part 313 may be passed through the tether binding part 33 of the right tether 31, and connected to the top of the rightward extension part 312. The first pulled extension part 314 may be connected to the first sliding bound part 313 at the top of the tether binding part 33, and extended to the tether controller 40 through the upper deployment part 11.

That is, based on the first sliding bound part 313, the lower portion of the right tether 31 positioned between the first sliding bound part 313 and the left fixed part 311 may correspond to the rightward extension part 312, and the upper portion of the right tether 31 positioned between the first sliding bound part 313 and the tether controller 40 may correspond to the first pulled extension part 314. When the first pulled extension part 314 is pulled through the tether controller 40, the rightward extension part 312 may be pulled and moved to the left while the length thereof is shortened, and the tensile force may be increased.

Referring to FIGS. 6 and 7, the left tether 32 in accordance with the embodiment of the present invention may include a right fixed part 321, a leftward extension part 322, a second sliding bound part 323 and a second pulled extension part 324.

The right fixed part 321 may correspond to the lower end of the left tether 32, and be fixed to the bottom (point PB) of the right portion of the surrounding airbag 10. The leftward extension part 322 may be extended leftward from the right fixed part 321 toward the leftward deployment part 22 so as to cross the right tether 31, and extended upward along the left edge of the leftward deployment part 22 on the left of the right tether 31.

The leftward extension part 322 may be extended to the left from the right fixed part 321 and bent to the right, as a whole. In other words, the leftward extension part 322 may be extended in a leftward convex shape. The second sliding bound part 323 may be passed through the tether binding part 33 of the left tether 32, and connected to the top of the leftward extension part 322. The second pulled extension part 324 may be connected to the second sliding bound part 323 at the top of the tether binding part 33, and extended to the tether controller 40 through the upper deployment part 11 with the first pulled extension part 314.

That is, based on the second sliding bound part 323, the lower portion of the left tether 32 positioned between the second sliding bound part 323 and the right fixed part 321 may correspond to the leftward extension part 322, and the upper portion of the left tether 32 positioned between the second sliding bound part 323 and the tether controller 40 may correspond to the second pulled extension part 324. When the second pulled extension part 324 is pulled through the tether controller 40, the leftward extension part 322 may be pulled and moved to the right while the length thereof is shortened, and the tensile force may be increased.

Referring to FIG. 6, the right tether 31 and the left tether 32 may start from the points PA and PB, respectively, and pass through a point PC in the middle of the upper portion. When a tensile force F1 is applied to the upper portions of the right and left tethers 31 and 32 having passed through the point PC, tensile forces F2 and F3 may also be consecutively applied to the lower portions of the right and left tethers 31 and 32, respectively. Finally, a force F4 may be generated to induce the rightward deployment part 21 and the leftward deployment part 22 to gather in the middle.

As the tensile forces applied to the right and left tethers 31 and 32 are increased, the rightward and leftward deployment parts 21 and 22 may gather in the middle. Then, the binding force therebetween may be increased, while a constraining force for constraining a forward behavior of the passenger 2 is increased. Through the action of the behavior constraint tether 30, the constraining force of constraining a forward behavior of the passenger 2 may be adjusted.

The tether binding part 33 may provide a passage through which the right and left tethers 31 and 32 can be passed and moved, in order to slidably bind the intermediate portions of the right and left tethers 31 and 32. The tether binding part 33 may be formed by sewing a fiber material to the surrounding airbag 10 or coupling and fixing a material to the surrounding airbag 10, the material having a passage through which the right and left tethers 31 and 32 can be passed.

The tether binding part 33 may have one passage through which the right and left tethers 31 and 32 can be passed together. According to such a structure, the lengths of the right and left tethers 31 and 32 can be easily and flexibly adjusted to the same extent at the same time. Furthermore, the tether binding part 33 may have a plurality of passages through which the right and left tethers 31 and 32 can be independently passed. According to such a structure, the lengths of the right and left tethers 31 and 32 can be more stably and flexibly adjusted without interfering with each other.

The tether binding part 33 may be disposed at a higher level than the neck of the passenger 2. Therefore, the right and left tethers 31 and 32 which are separated from each other and disposed to cross each other under the tether binding part 33 may stably constrain the body of the passenger 2, and thus more stably prevent an injury of the passenger 2 such as neck bending, which may occur when the head of the passenger 2 suddenly leans forward with respect to the body thereof.

Figure 8:
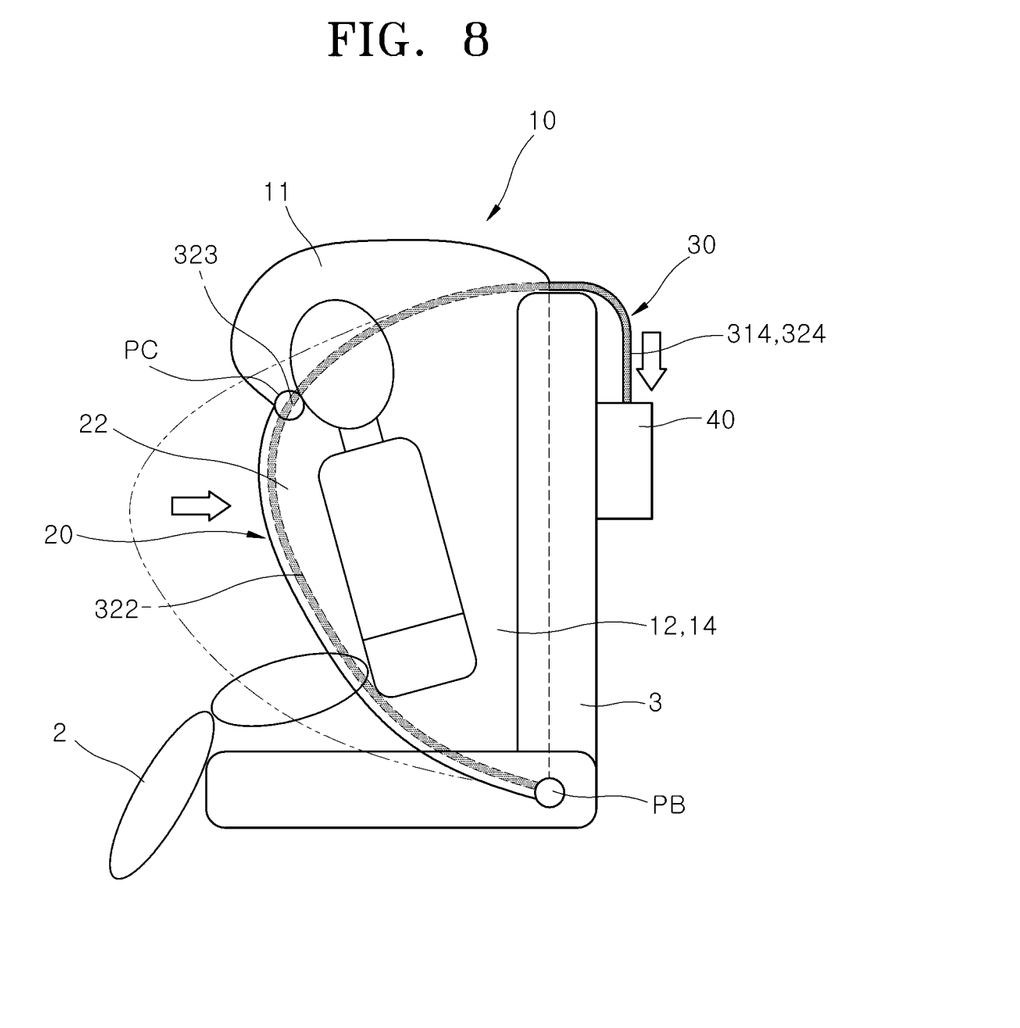
FIG. 8 is a conceptual view for describing an action by length adjustment of the behavior constraint tether of the airbag apparatus for a vehicle in accordance with the embodiment of the present invention.

FIG. 8 is a conceptual view for describing an action by the length adjustment of the behavior constraint tether of the airbag apparatus for a vehicle in accordance with the embodiment of the present invention.

Referring to FIGS. 3 and 8, the tether controller 40 in accordance with the embodiment of the present invention may include a tether in-out unit 41, an input unit 42 and a constraining force control unit 43.

The tether in-out unit 41 may serve to adjust a tensile force applied to the behavior constraint tether 30 by pulling or releasing the behavior constraint tether 30, and be installed on the rear surface of the seat 3. The tether in-out unit 41 is not limited to specific structures and shapes including publicly known techniques, as long as the tether in-out unit 41 can put in or out an end of the behavior constraint tether 30 through an action of pulling or releasing with rolling the end of the behavior constraint tether 30.

The input unit 42 may receive information on the passenger 2 and the collision state of the vehicle. More specifically, the input unit 42 may receive information on the build and posture of the passenger 2, the collision state of the vehicle, and the deployment states of the surrounding airbag 10 and the front airbag 20 from a camera, a controller, a collision sensor and the like.

The constraining force control unit 43 may control the action of the tether in-out unit 41 according to the information inputted to the input unit 42. The behavior constraint tether 30 may constrain the behavior of the passenger 2 at an intensity corresponding to a tensile force, while the length thereof is varied under control of the constraining force control unit 43.

For example, when the tether controller 40 is in-operated by the constraining force control unit 43, the behavior constraint tether 30 and the front airbag 20 may be closely contacted with the front part of the passenger 2 at preset pressure as illustrated in FIG. 8 from the state illustrated in FIG. 7. Such an action may stably constrain the forward behavior of the passenger 2.

More specifically, the airbag apparatus 1 for a vehicle the embodiment of the present invention may sequentially implement a step in which information on the build and behavior of the passenger 2 is received through the input unit 42 in real time, a step in which the surrounding airbag 10 and the front airbag 20 are deployed in case of a collision of the vehicle, tension is primarily applied to the behavior constraint tether 30 mounted on the surrounding airbag 10 and the front airbag 20, and information on the collision state of the vehicle is received through the input unit 42, and a step in which the tension of the behavior constraint tether 30 is secondarily controlled according to the build of the passenger 2 and the collision state of the vehicle through the actions of the constraining force control unit 43 and the tether in-out unit 41. Through the process, an injury of the passenger 2 can be more stably prevented.

In the airbag apparatus 1 for a vehicle in accordance with the embodiment of the present invention, the surrounding airbag 10 and the front airbag 20 may cover the passenger 2 in all directions including the front, top and sides, in case of a collision of the vehicle. And as the surrounding airbag 10 and the front airbag 20 are constrained each other through the behavior constraint tether 30, the surrounding airbag 10 and the front airbag 20 may be reliably deployed in a predetermined shape.

Therefore, the airbag apparatus 1 can stably protect the passenger 2 through an omnidirectional cushion force, regardless of the posture of the passenger 2 of the autonomous vehicle and the direction, angle and position of the seat 3. Furthermore, although a front airbag and a side airbag are not separately mounted, the airbag apparatus 1 can implement the same performance. Thus, the airbag apparatus 1 can be easily applied.

Furthermore, the behavior constraint tether 30 and the front airbag 20 may be closely contacted with the passenger 2 at the same time and serve as a safety belt. Thus, although an existing safety belt is omitted, the safety of the passenger 2 can be secured, which makes it possible to increase the activity and convenience of the passenger 2 at normal times.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An airbag apparatus for a vehicle, comprising:
    a surrounding airbag installed in a seat on which a passenger is seated, and configured to be deployed toward the passenger configured to cover an upper part and side parts of the passenger;
    a front airbag connected to the surrounding airbag, and laterally deployed configured to cover a front part of the passenger; and
    a behavior constraint tether extended from the front airbag to an upper portion of the surrounding airbag configured to constrain the surrounding airbag and the front airbag, and configured to constrain a forward motion of the passenger through a tensile force.

2. The airbag apparatus of claim 1, wherein the surrounding airbag and the front airbag are folded in a reverse U-shape and stored in the seat.

3. The airbag apparatus of claim 1, wherein the surrounding airbag comprises:
    an upper deployment part installed in the upper portion of the seat and is configured to be deployed forward from a top of the passenger; and
    side deployment parts installed in side portions of the seat, connected to the front airbag, and is configured to be deployed forward from left and right sides of the passenger with the upper deployment part.

4. The airbag apparatus of claim 1, wherein the front airbag comprises:
    a rightward deployment part connected to the left side of the surrounding airbag, and is configured to be deployed to a right front of the passenger; and
    a leftward deployment part connected to the right side of the surrounding airbag, and is configured to be deployed to a left front of the passenger to overlap the rightward deployment part.

5. The airbag apparatus of claim 4, wherein a right edge of the rightward deployment part is configured to be positioned on the right of the passenger in response to the rightward deployment part being deployed, and
    a left edge of the leftward deployment part is configured to be positioned on the left of the passenger in response to the leftward deployment part being deployed.

6. The airbag apparatus of claim 4, wherein the behavior constraint tether comprises:
    a right tether extended upward to the upper portion of the surrounding airbag along a right edge of the rightward deployment part;
    a left tether extended upward to the upper portion of the surrounding airbag along a left edge of the leftward deployment part; and
    a tether binding part slidably binding intermediate portions of the right tether and the left tether.

7. The airbag apparatus of claim 6, wherein the right tether comprises:
    a left fixed part fixed to a bottom of a left portion of the surrounding airbag;
    a rightward extension part extended from the left fixed part to the rightward deployment part to cross the left tether, and extended upward from the right of the left tether along the right edge of the rightward deployment part;
    a first sliding bound part formed at an upper portion of the rightward extension part and passing through the tether binding part; and
    a first pulled extension part disposed at the upper portion of the surrounding airbag, and connected to the first sliding bound part.

8. The airbag apparatus of claim 6, wherein the left tether comprises:
- a right fixed part fixed to a bottom of a right portion of the surrounding airbag;
- a leftward extension part extended from the right fixed part to the leftward deployment part to cross the right tether, and extended upward from the left of the right tether along the left edge of the leftward deployment part;
- a second sliding bound part formed at the upper portion of the leftward extension part and passing through the tether binding part; and
- a second pulled extension part disposed at the upper portion of the surrounding airbag, and connected to the second sliding bound part.

9. The airbag apparatus of claim 6, wherein the tether binding part is configured to be disposed at a higher level than a neck of the passenger.

10. The airbag apparatus of claim 1, further comprising a tether controller configured to control a constraining force for the front part of the passenger by adjusting a length of the behavior constraint tether.

11. The airbag apparatus of claim 10, wherein the tether controller comprises:
- a tether in-out unit installed on the seat, and configured to adjust a tensile force applied to the behavior constraint tether while pulling or releasing the behavior constraint tether;
- an input unit configured to receive information on the passenger or a collision state of a vehicle; and
- a constraining force control unit configured to control an operation of the tether in-out unit according to the information inputted to the input unit, and adjust the constraining force of the behavior constraint tether for the passenger.

12. The airbag apparatus of claim 11, wherein when the constraining force control unit operates the tether in-out unit, the behavior constraint tether and the front airbag are closely contacted with the front part of the passenger at preset pressure, while the length of the behavior constraint tether is adjusted.

* * * * *